(12) United States Patent
Juels

(10) Patent No.: US 9,154,480 B1
(45) Date of Patent: Oct. 6, 2015

(54) CHALLENGE-RESPONSE AUTHENTICATION OF A CRYPTOGRAPHIC DEVICE

(71) Applicant: Ari Juels, Brookline, MA (US)

(72) Inventor: Ari Juels, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 95 days.

(21) Appl. No.: 13/711,859

(22) Filed: Dec. 12, 2012

(51) Int. Cl.
*H04L 29/06* (2006.01)

(52) U.S. Cl.
CPC ...................................... *H04L 63/08* (2013.01)

(58) Field of Classification Search
CPC ......... G06F 21/31; H04L 9/32; H04L 9/3228; H04L 9/3263; H04L 9/3273; H04L 9/3234; H04L 9/3271; H04L 9/3276; H04L 63/0846; H04L 63/107; H04L 2209/38
USPC .......................................................... 713/168
See application file for complete search history.

(56) References Cited

U.S. PATENT DOCUMENTS

| | | | | |
|---|---|---|---|---|
| 4,947,430 | A * | 8/1990 | Chaum | 713/180 |
| 5,970,148 | A * | 10/1999 | Meier | 713/168 |
| 6,161,180 | A * | 12/2000 | Matyas et al. | 713/169 |
| 6,772,336 | B1 * | 8/2004 | Dixon, Jr. | 713/165 |
| 7,272,723 | B1 * | 9/2007 | Abbott et al. | 713/185 |
| 7,512,794 | B2 * | 3/2009 | Kwok | 713/168 |
| 8,656,163 | B2 * | 2/2014 | Villegas et al. | 713/168 |
| 2001/0043702 | A1 * | 11/2001 | Elteto et al. | 380/278 |
| 2003/0172090 | A1 * | 9/2003 | Asunmaa et al. | 707/200 |
| 2004/0098585 | A1 * | 5/2004 | Grove et al. | 713/168 |
| 2004/0153667 | A1 * | 8/2004 | Kastelewicz et al. | 713/201 |
| 2005/0235148 | A1 * | 10/2005 | Scheidt et al. | 713/168 |
| 2007/0192601 | A1 * | 8/2007 | Spain et al. | 713/168 |
| 2007/0226497 | A1 * | 9/2007 | Taylor | 713/168 |
| 2007/0300070 | A1 * | 12/2007 | Shen-Orr et al. | 713/176 |

(Continued)

OTHER PUBLICATIONS

OATH Technical Focus Group, "OATH Reference Architecture, Release 2.0 Initiative for Open AuTHentication (OATH)", 2004-2007, Initiative for Open AuTHentication, Release 2.0, entire document, http://www.openauthentication.org/files/download/oathPdf/ReferenceArchitectureVersion2.pdf.*

(Continued)

*Primary Examiner* — Christopher Brown
*Assistant Examiner* — Ronald Baum
(74) *Attorney, Agent, or Firm* — Ryan, Mason & Lewis, LLP

(57) ABSTRACT

In conjunction with a registration mode of operation, a first cryptographic device in one embodiment sends challenges to a second cryptographic device comprising a symmetric-key cryptographic module or other key-based cryptographic module that utilizes one or more secret keys. The first cryptographic device receives from the second cryptographic device responses to respective ones of the challenges, and stores information characterizing the responses. In conjunction with an authentication mode of operation, the first cryptographic device sends a selected one of the challenges to the second cryptographic device, receives from the second cryptographic device a response to the selected challenge, and authenticates the second cryptographic device utilizing the response to the selected challenge and the stored information. The first cryptographic device generates the challenges and authenticates the second cryptographic device without having knowledge of the one or more secret keys of the key-based cryptographic module of the second cryptographic device.

24 Claims, 3 Drawing Sheets

(56) References Cited

U.S. PATENT DOCUMENTS

| | | | |
|---|---|---|---|
| 2008/0010455 A1* | 1/2008 | Holtzman et al. | 713/168 |
| 2008/0159534 A1* | 7/2008 | Rager et al. | 380/247 |
| 2009/0011739 A1* | 1/2009 | Cofta | 455/411 |
| 2009/0288143 A1* | 11/2009 | Stebila et al. | 726/3 |
| 2010/0250936 A1* | 9/2010 | Kusakawa et al. | 713/169 |
| 2011/0197266 A1* | 8/2011 | Chu et al. | 726/5 |
| 2012/0011360 A1* | 1/2012 | Engels et al. | 713/166 |
| 2012/0242459 A1* | 9/2012 | Lambert | 340/10.3 |
| 2013/0051552 A1* | 2/2013 | Handschuh et al. | 380/44 |
| 2013/0308778 A1* | 11/2013 | Fosmark et al. | 380/270 |

OTHER PUBLICATIONS

Barinov, D., "Security Implications of NFC in Authentication and Identity Management", SecureKey Technologies Inc., RSAConference Europe, 2013, session MBS-W09, entire document, http://www.rsaconference.com/writable/presentations/file_upload/mbs-w09-security-implications-of-nfc-in-authentication-and-identity-management.pdf.*

Apple Inc., "iOS Security," http://images.apple.com/ipad/business/docs/iOS_Security_May12.pdf, May 2012, 20 pages.

B. Gassend et al., "Silicon Physical Random Functions," 9th ACM Conference on Computer and Communications Security (CCS), Nov. 2002, pp. 148-160.

A. Juels et al., "A Fuzzy Vault Scheme," Designs, Codes and Cryptography, Feb. 2006, pp. 237-257, vol. 38, No. 2.

R. Pappu et al., "Physical One-Way Functions," Science, Sep. 2002, pp. 2026-2030, vol. 297, No. 5589.

M.O. Rabin et al., "Time-Lapse Cryptography," Harvard University School of Engineering and Computer Science, Technical Report TR-22-06, Dec. 2006, 17 pages.

* cited by examiner

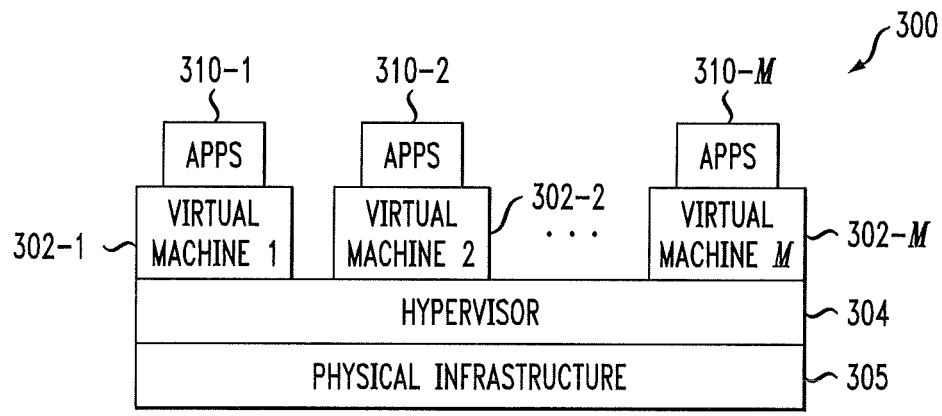
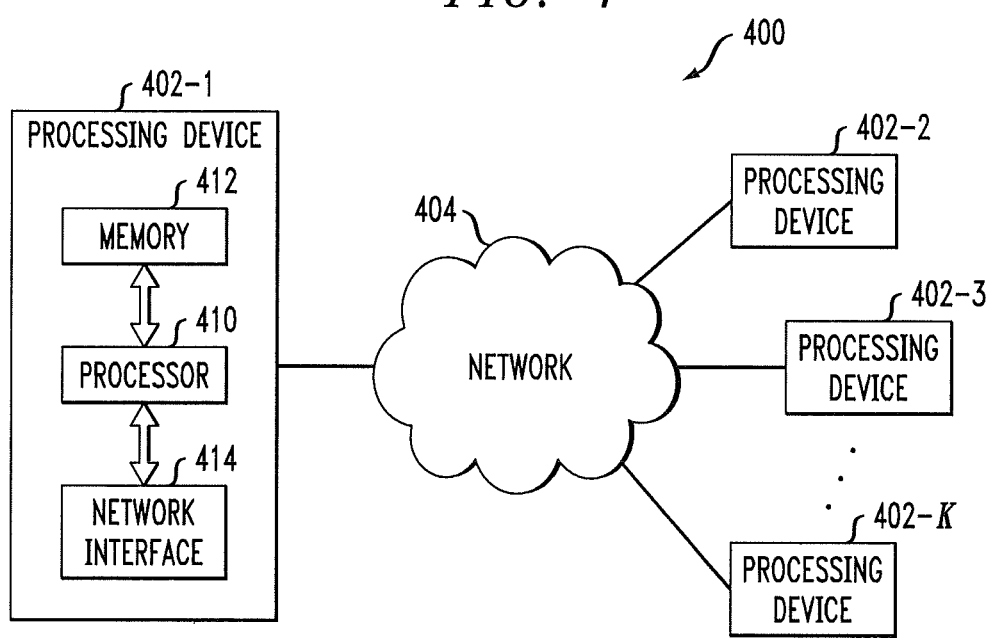

CHALLENGE-RESPONSE AUTHENTICATION OF A CRYPTOGRAPHIC DEVICE

FIELD

The field relates generally to cryptography, and more particularly to authentication techniques implemented using cryptographic devices.

BACKGROUND

Cryptographic devices include, by way of example, one-time passcode (OTP) devices such as authentication tokens. Authentication tokens are typically implemented as small, hand-held devices that display a series of passcodes over time. A user equipped with such an authentication token reads the currently displayed passcode and enters it into a computer or other element of an authentication system as part of an authentication operation. This type of dynamic passcode arrangement offers a significant security improvement over authentication based on a static password.

Conventional authentication tokens include both time-synchronous and event-synchronous tokens.

In a typical time-synchronous token, the displayed passcodes are based on a secret value and the time of day. A verifier with access to the secret value and a time of day clock can verify that a given presented passcode is valid.

One particular example of a time-synchronous authentication token is the RSA SecurID® user authentication token, commercially available from RSA, The Security Division of EMC Corporation, of Bedford, Mass., U.S.A.

Event-synchronous tokens generate passcodes in response to a designated event, such as a user pressing a button on the token. Each time the button is pressed, a new passcode is generated based on a secret value and an event counter. A verifier with access to the secret value and the current event count can verify that a given presented passcode is valid.

Other known types of authentication tokens include hybrid time-synchronous and event-synchronous tokens.

Passcodes can be communicated directly from the authentication token to a computer or other element of an authentication system, instead of being displayed to the user. For example, a wired connection such as a universal serial bus (USB) interface may be used for this purpose. Wireless authentication tokens are also known. In authentication tokens of this type, the passcodes are wirelessly communicated to a computer or other element of an authentication system. These wired or wireless arrangements, also referred to herein as connected tokens, save the user the trouble of reading the passcode from the display and manually entering it into the computer.

The above arrangements may be viewed as examples of what are more generally referred to herein as hardware authentication tokens. However, authentication tokens can also be implemented in the form of software installed on a computer, mobile phone or other processing device. Like hardware authentication tokens, software authentication tokens can be implemented as time-synchronous, event-synchronous, or hybrid time-synchronous and event-synchronous tokens.

Cryptographic devices such as the above-noted computers, mobile phones or other processing devices may comprise key-based cryptographic modules. Examples of such modules include trusted platform modules (TPMs) and may be based on symmetric keys or public key cryptography. Conventional techniques for authenticating cryptographic devices that include TPMs or other key-based cryptographic modules can be problematic. For example, some techniques involving symmetric-key cryptographic modules require that a verifying cryptographic device have full knowledge of the symmetric keys in order to authenticate the device containing the module.

SUMMARY

Illustrative embodiments of the present invention provide improved challenge-response authentication techniques that can allow a verifying device to authenticate another device that includes a key-based cryptographic module without requiring the verifying device to have knowledge of the secret keys of the key-based cryptographic module.

In one embodiment, a first cryptographic device interacts with a second cryptographic device in registration and authentication modes of operation. The second cryptographic device comprises a key-based cryptographic module that utilizes one or more secret keys.

In conjunction with the registration mode of operation, the first cryptographic device sends challenges to the second cryptographic device. The first cryptographic device receives from the second cryptographic device responses to respective ones of the challenges, and stores information characterizing the responses. The stored information may comprise the responses themselves, or information derived from those responses.

In conjunction with the authentication mode of operation, the first cryptographic device sends a selected one of the challenges to the second cryptographic device, receives from the second cryptographic device a response to the selected challenge, and authenticates the second cryptographic device utilizing the response to the selected challenge and the stored information. The first cryptographic device generates the challenges and authenticates the second cryptographic device without having knowledge of the one or more secret keys of the key-based cryptographic module of the second cryptographic device.

The key-based cryptographic module in one or more embodiments may comprise, for example, a symmetric-key cryptographic module, with the first cryptographic device authenticating the second cryptographic device without having knowledge of one or more symmetric keys of that device. Other embodiments can implement similar functionality for cryptographic devices having public-key cryptographic modules.

BRIEF DESCRIPTION OF THE DRAWINGS

FIGS. 3 and 4 show examples of processing platforms that may be utilized to implement at least a portion of the communication systems of FIGS. 1 and 2.

DETAILED DESCRIPTION

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

The term "passcode" as used herein is intended to include authentication information such as OTPs, or more generally any other information that may be utilized for cryptographic authentication purposes. Although the illustrative embodiments will be described below primarily in the context of OTPs, it is to be appreciated that the invention is more broadly applicable to any other type of passcode.

The term "cryptographic device" as used herein is intended to be construed broadly, so as encompass not only authentication tokens but also other types of devices that can participate in challenge-response authentication processes in the manner disclosed herein. Similarly, the term "authentication server" should be understood to encompass any type of processing device or set of such devices that is operative to authenticate a passcode provided by an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides challenge-response authentication techniques for use with authentication tokens and other types of cryptographic devices.

Figure 1:
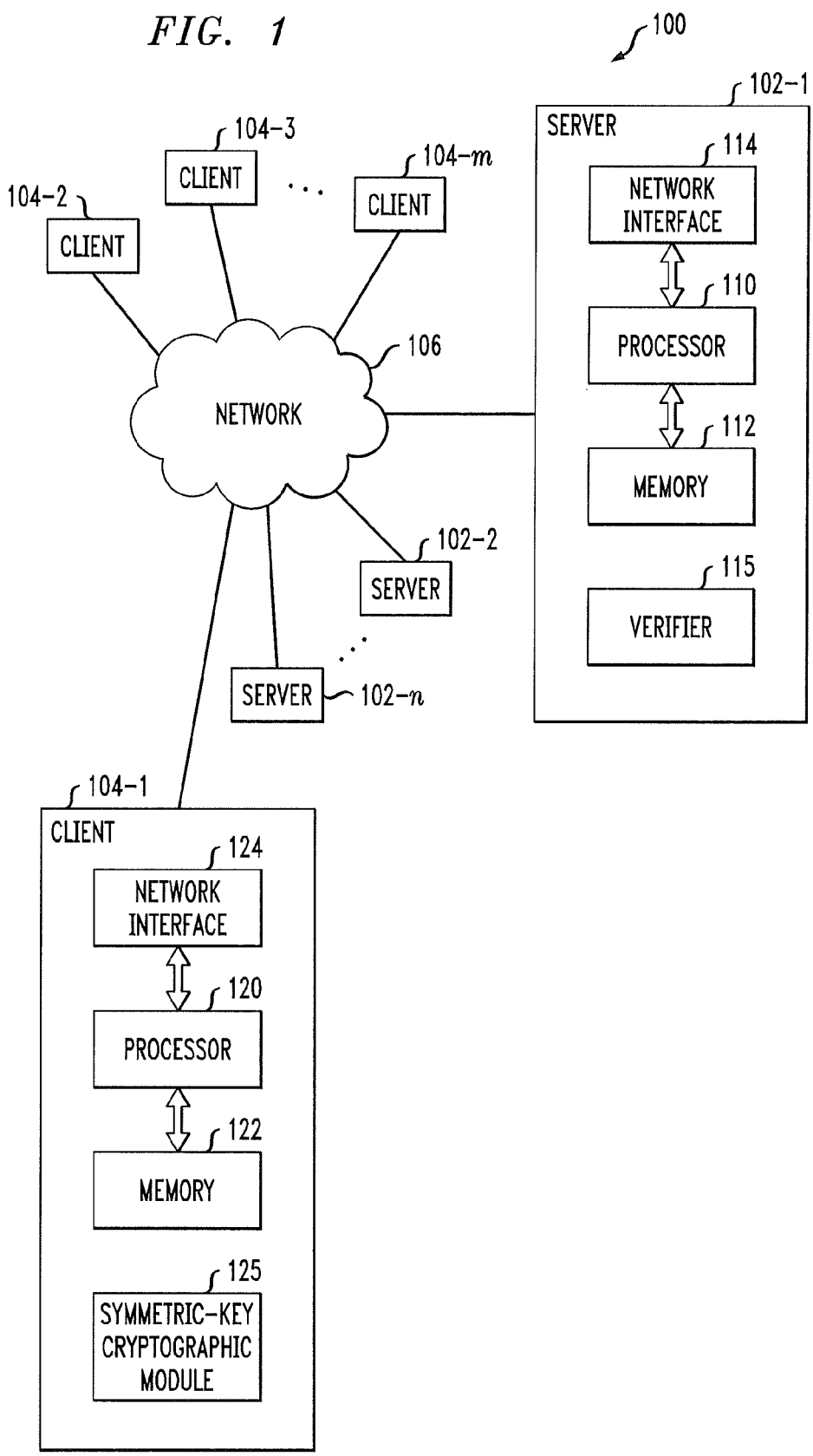
FIG. 1 is a block diagram of a communication system with challenge-response authentication functionality in an illustrative embodiment of the invention.

FIG. 1 shows a communication system 100 that incorporates challenge-response authentication functionality in an illustrative embodiment. The system 100 comprises a plurality of servers 102-1, 102-2, . . . 102-$n$ that are configured to communicate with a plurality of clients 104-1, 104-2, . . . 104-$m$, over a network 106.

The servers 102 and clients 104 may be implemented as respective processing devices. A given such processing device may comprise, for example, a computer, a mobile telephone or other type of communication device. Each such processing device generally comprises at least one processor and an associated memory, and implements one or more functional modules for controlling certain features of the system 100.

The system 100 in the present embodiment implements one or more processes for challenge-response authentication. Examples of such a process performed at least in part in conjunction with a given one of the clients 104 authenticating to one or more of the servers 102 will be described below, but it is to be appreciated that numerous other types of processes may be used in other embodiments.

A given one of the servers 102-1 in the present embodiment comprises a processor 110 coupled to a memory 112. The processor 110 may comprise a microprocessor, a microcontroller, an application-specific integrated circuit (ASIC), a field-programmable gate array (FPGA) or other type of processing circuitry, as well as portions or combinations of such circuitry elements. The memory 112 may comprise random access memory (RAM), read-only memory (ROM) or other types of memory, in any combination.

The memory 112 and other memories disclosed herein may be viewed as examples of what are more generally referred to as "computer program products" storing executable computer program code.

Also included in the server 102-1 is network interface circuitry 114. The network interface circuitry 114 allows the server 102-1 to communicate over the network 106 with the other servers 102 and with the clients 104, and may comprise one or more conventional transceivers.

The server 102-1 further includes a verifier 115 configured to participate in a challenge-response authentication process with one or more of the clients 104. The verifier may be implemented at least in part in the form of software that is stored in memory 112 and executed by processor 110.

The other servers 102 of the system 100 are assumed to be configured in a manner similar to that shown for server 102-1 in the figure.

A given one of the clients 104-1 in the present embodiment comprises a processor 120 coupled to a memory 122. The processor 120, like processor 110 in server 102, may comprise a microprocessor, a microcontroller, an ASIC, an FPGA or other type of processing circuitry, as well as portions or combinations of such circuitry elements, and the memory 122 may comprise RAM, ROM or other types of memory, in any combination.

Also included in the client 104-1 is network interface circuitry 124. The network interface circuitry 124 allows the client 104-1 to communicate over the network 106 with the servers 102 and with the other clients 104, and may comprise one or more conventional transceivers.

The client 104-1 further includes a symmetric-key cryptographic module 125. It is assumed in the present embodiment that the symmetric-key cryptographic module 125 comprises a hardware module such as a TPM that utilizes one or more symmetric keys. More particularly, such a hardware module may be configured to perform key storage and cryptographic operations. In many instances, such as Apple iPhones and other types of mobile telephones, as well as many different types of desktop and laptop computers, the corresponding hardware module performs only symmetric-key cryptographic operations. For example, in the case of devices equipped with the Apple iOS mobile operating system, the hardware module is typically in the form of a crypto engine that stores a symmetric key comprising a device-specific advanced encryption standard (AES) key referred to as a unique ID (UID).

As mentioned previously, conventional arrangements of this type are problematic in that a verifying device generally must have full knowledge of the corresponding symmetric keys in order to authenticate the device containing the cryptographic module. However, Apple generally does not disclose the UID of an iOS device to application developers or third-party services, and so these entities are unable to achieve hardware-based assurance of the authenticity of the device or its associated user.

In the present embodiment, verifier 115 in server 102-1 is able to utilize challenge-response authentication to authenticate the client 104-1 containing symmetric-key cryptographic module 125 without the verifier 115 having any knowledge of the one or more secret keys utilized by the module 125.

In other embodiments, portions of the symmetric-key cryptographic module may be implemented at least in part in the form of software that is stored in memory 122 and executed by processor 120.

The other clients 104 of the system 100 are assumed to be configured in a manner similar to that shown for client 104-1 in the figure.

The servers 102 and clients 104 may include additional components not specifically illustrated in this figure but of a type commonly used in implementing authentication processes, as will be appreciated by those skilled in the art.

The network 106 may comprise, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks.

The communication system 100 as shown in FIG. 1 is configured to allow a first cryptographic device, such as a given one of the clients 104 comprising symmetric-key cryptographic module 125, to authenticate itself to at least a second cryptographic device, such as one or more of the servers 102, using at least one symmetric key associated with the symmetric-key cryptographic module, and without the second cryptographic device having knowledge of the symmetric key. The communication system 100 and other similar systems herein are therefore also referred to as authentication systems. Additional details regarding exemplary challenge-response authentication techniques that may be implemented in system 100 will be described in greater detail below.

It is to be appreciated that the particular set of elements shown in FIG. 1 for providing challenge-response authentication functionality is presented by way of example, and in other embodiments additional or alternative elements may be used. Thus, another embodiment may include additional networks and additional sets of clients or servers.

As mentioned previously, various elements of system 100 such as clients, servers or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices. Examples of such processing platforms that may form at least a portion of the system 100 will be described below in conjunction with FIGS. 3 and 4.

Figure 2:
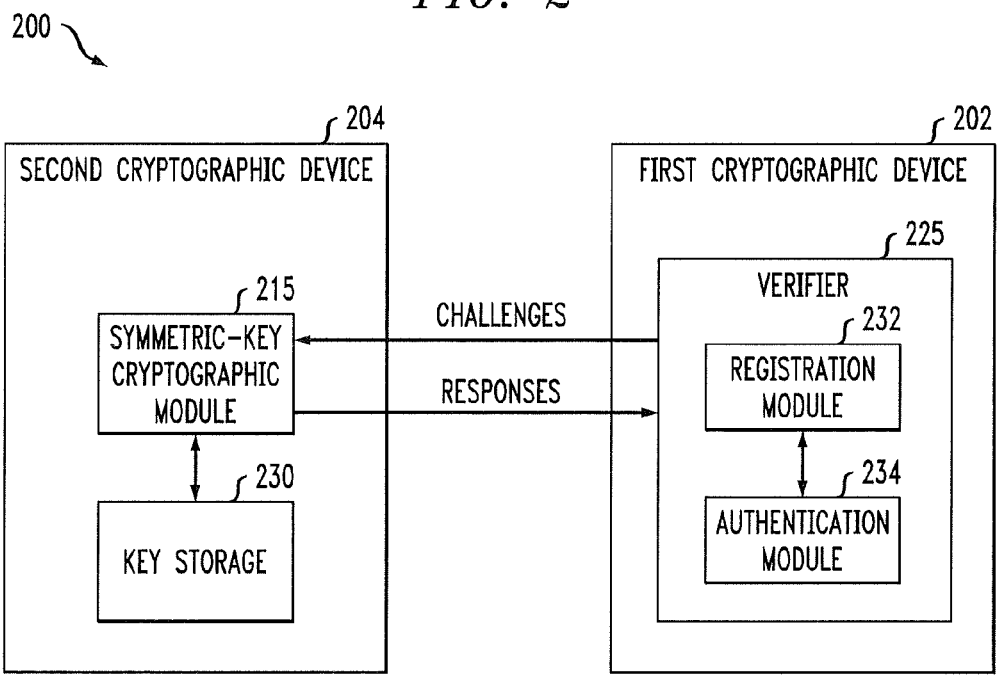
FIG. 2 shows another embodiment of a communication system implementing challenge-response authentication functionality utilizing first and second cryptographic devices.

FIG. 2 shows another communication system 200 comprising a first cryptographic device 202 and a second cryptographic device 204. This system may be viewed, for example, as comprising a portion of system 100 in which first cryptographic device 202 corresponds generally to server 102-1 and second cryptographic device 204 corresponds generally to client 104-1. Like system 100, system 200 may be implemented using processing devices of one or more processing platforms.

The first and second cryptographic devices 202 and 204 may comprise, for example, a computer and a mobile telephone, respectively, or other types of processing devices in any combination.

As another example, the first and second cryptographic devices may comprise an authentication server and a hardware or software authentication token, respectively. In such an arrangement, the authentication token may comprise a time-synchronous authentication token such as the above-noted RSA SecurID® user authentication token, suitably modified as disclosed herein to participate in a challenge-response authentication process. Numerous other alternative arrangements are possible.

The first and second cryptographic devices in the present embodiment illustratively comprise modules 215, 225, 230, 232 and 234. In other embodiments, these modules may be combined into fewer modules or one or more of the modules may be subdivided into additional modules. Also, the associated functionality may be implemented using other types and arrangements of modules.

The first cryptographic device 202 is configured to authenticate second cryptographic device 204 comprising symmetric-key cryptographic module 215 using a verifier 225 that interacts with the symmetric-key cryptographic module 215 by issuing challenges to that module and receiving corresponding responses.

The second cryptographic device 204 in the present embodiment further comprises key storage 230 coupled to the symmetric-key cryptographic module 215. Although shown as being separate from the module 215, the key storage 230 may be at least partially incorporated into module 215 in other embodiments. The symmetric-key cryptographic module 215 utilizes one or more secret keys, and more particularly one or more symmetric keys, that may be stored in key storage 230.

The verifier 225 of the first cryptographic device 202 more particularly comprises a registration module 232 and an authentication module 234.

The challenge-response authentication process in the present embodiment involves the first and second cryptographic devices 202 and 204 operating in a registration mode of operation in which registration module 232 is utilized and operating in an authentication mode of operation in which the authentication module 234 is utilized.

Each of the first and second cryptographic devices 202 and 204 may comprise processor, memory and network interface elements similar to those previously described in the context of the servers 102 and clients 104 of FIG. 1. The modules 215, 225, 230, 232 and 234 may be implemented at least in part using such processor, memory and network interface elements. The network interface elements, for example, can comprise transceivers configured to support exchange of challenges and responses over one or more networks that interconnect the first and second cryptographic devices 202 and 204.

The challenge-response authentication process utilizing modules 232 and 234 and associated interactions between verifier 225 and cryptographic module 215 of the respective first and second cryptographic devices 202 and 204 in the present embodiment proceeds in the following manner.

In conjunction with the registration mode of operation, the first cryptographic device 202 sends challenges to the second cryptographic device 204, and receives from the second cryptographic device 204 responses to respective ones of the challenges. The first cryptographic device 202 stores information characterizing the responses, for subsequent use in the authentication mode of operation. This may involve, for example, storing the actual responses, or storing information derived at least in part from the responses but not storing the responses themselves. Accordingly, "storing a response" as that phrase is broadly used herein may be implemented without requiring storage of a complete response as received. The term "response" is therefore also intended to be broadly construed herein to encompass at least a subset of information received responsive to one or more challenges.

In conjunction with the authentication mode of operation, the first cryptographic device 202 sends a selected one of the challenges to the second cryptographic device 204, and receives from the second cryptographic device 204 a response to the selected challenge. The first cryptographic device 202 authenticates the second cryptographic device 204 utilizing the response to the selected challenge and the above-noted stored information from the registration mode of operation.

The first cryptographic device 202 can be configured to repeat the sending of a selected one of the challenges, the receiving of a response to the selected challenge, and the authenticating of the second cryptographic device for each of a plurality of additional different selected ones of the challenges.

Although not expressly illustrated in FIG. 2, a counter may be included in the authentication module 234 or elsewhere in the verifier 225 for use in selecting challenges in the authentication mode of operation. For example, the first authentication device 202 may initialize the counter, select a challenge in conjunction with the authentication mode of operation based at least in part on a current value of the counter, and then increment the counter if the second cryptographic device 204 is authenticated based on its response to the selected challenge. In this manner, multiple authentications can be supported in an efficient manner for a single registration.

It should be noted that the first cryptographic device 202 in the present embodiment is configured to generate the challenges and to authenticate the second cryptographic device 204 without having knowledge of the one or more symmetric keys of the symmetric-key cryptographic module 215. This allows a verifying device such as first cryptographic device 202 to achieve hardware-based assurance of the authenticity of the second cryptographic device 204 or its associated user without providing the first cryptographic device with access to the symmetric keys of the second cryptographic device.

Such an arrangement is particularly advantageous, for example, in embodiments involving Apple iPhones and other types of mobile telephones, as well as many different types of desktop and laptop computers, that include a crypto engine or other type of cryptographic module that performs only symmetric-key cryptographic operations. For example, in the case of devices equipped with the Apple iOS mobile operating system, challenge-response authentication of the type described above can be used to allow a verifying device to authenticate such devices without the verifying device having access to the corresponding device UIDs. Accordingly, application developers and third-party services that do not have the UID for a given device can nonetheless configure their respective applications and services to utilize the symmetric-key cryptographic module of the device in support of a challenge-response authentication process.

By way of example, in one possible implementation of the above-described challenge-response authentication process, the challenges comprise a set $C=\{c_i\}_{i=1}^{n}$ of n challenges, where $c_i \epsilon_R \{0,1\}^k$ is a randomly selected k-bit value, and where k and n denote security parameters. It should be noted that variable n in this context is not the same n referred to in the context of the total number of servers in FIG. 1. The responses characterized by the stored information comprise a set of n responses $R=\{r_i\}_{i=1}^{n}$ received responsive to corresponding ones of the set of n challenges $C=\{c_i\}_{i=1}^{n}$ where response $r_i=f_\kappa(c_i)$ for each $c_i$ and $f_\kappa(c_i)$ is a function that utilizes a given one of the secret keys of the symmetric-key cryptographic module 215 of the second cryptographic device, denoted as secret key κ The selected challenge is a challenge $c_j$ selected from the set of challenges $C=\{c_i\}_{i=1}^{n}$ based on a current counter value j, and the second cryptographic device is authenticated if and only if $r_j'=r_j$, where $r_j'$ is the response to the selected challenge $c_j$.

An exemplary protocol based on the implementation described above is as follows, carried out between a verifier denoted V and a symmetric-key cryptographic module denoted SKCM. These protocol entities correspond to verifier 225 and symmetric-key cryptographic module 215 in the FIG. 2 embodiment.

1. Registration:
   (a) V generates a set $C=\{c_i\}_{i=1}^{n}$ of n challenges, where $c_i \epsilon_R \{0,1\}^k$ is a randomly selected k-bit value, for security parameters k and n. For example, C may be derived pseudorandomly from a single cryptographic key.
   (b) V transmits each challenge $c_i \epsilon$ C to the SKCM.
   (c) The SKCM computes $f_\kappa(c_i)$ for each $c_i$ and returns the corresponding response $r_i$.
   (d) V stores (C, R), where $R=\{r_i\}_{i=1}^{n}$ and initializes counter j←1. As indicated previously, instead of storing R itself, V may store values derived from R, such as hashes of elements in R, or public keys derived from elements of R, in order to protect against compromise of its data and subsequent device impersonation.

2. Authentication:
   (a) To authenticate the SKCM, V transmits challenge $c_j$ to the SKCM.
   (b) On receiving response $r_j'$, V accepts the authentication session if and only if $r_j'=r_1$ V sets j←j+1.

In the above exemplary protocol, an adversary with transient access to the SKCM cannot later impersonate it. As the challenges in C are secret, one-time values, for large enough k, the adversary cannot feasibly extract enough challenge-response pairs from the SKCM to respond correctly to a future challenge by the verifier.

Other embodiments of the invention can use other types of challenge-response protocols. For example, the challenge-response authentication process utilizing modules 232 and 234 and associated interactions between verifier 225 and cryptographic module 215 of the respective first and second cryptographic devices 202 and 204 in another embodiment proceeds in the following manner.

In conjunction with the registration mode of operation, the first cryptographic device 202 sends a plurality of challenge-response pairs to the second cryptographic device 204.

In conjunction with the authentication mode of operation, the first cryptographic device 202 sends a selected challenge of one of the challenge-response pairs to the second cryptographic device 204, receives from the second cryptographic device 204 a response to the selected challenge, and authenticates the second cryptographic device 204 utilizing the response to the selected challenge.

The first cryptographic device 202 can be configured to repeat the sending of a selected challenge of one of the challenge-response pairs, the receiving of a response to the selected challenge, and the authenticating of the second cryptographic device for each of a plurality of additional different selected ones of the challenges.

Also, a counter of the type previously described may be used in selecting challenges in the authentication mode of operation. For example, the first authentication device 202 may initialize the counter, select a challenge in conjunction with the authentication mode of operation based at least in part on a current value of the counter, and then increment the counter if the second cryptographic device 204 is authenticated based on its response to the selected challenge. In this manner, multiple authentications can be supported in an efficient manner for a single registration.

As in the embodiment previously described, the first cryptographic device 202 in the present embodiment is also configured to generate the challenges and to authenticate the second cryptographic device 204 without having knowledge of the one or more symmetric keys of the symmetric-key cryptographic module 215. Again, this allows a verifying device such as first cryptographic device 202 to achieve hardware-based assurance of the authenticity of the second cryptographic device 204 or its associated user without providing the first cryptographic device with access to the symmetric keys of the second cryptographic device.

Moreover, the present embodiment is configured to facilitate legacy compatibility with existing devices in which the format of challenges and responses supported by symmetric-key cryptographic modules of those devices are incompatible with challenges and response formats required by an existing authentication server. For example, the above-noted iOS devices are generally configured to emit 256-bit AES values, which in some embodiments might otherwise be incompatible with the values expected by an authentication server configured to support authentication of RSA SecurID® authentication tokens which typically emit decimal-digit strings that are six or eight digits long.

By way of example, in one possible implementation of the above-described challenge-response authentication process, the challenge-response pairs comprise a set of challenge-response pairs $(c_i, r_i) \in C \times R$ where $C = \{c_i\}_{i=1}^n$ and $R = \{r_i\}_{i=1}^n$ and the received response for a given challenge $c_j$ is of the form $r_j' = Dec_{\lambda_j}[s_j]$ where $\lambda_j = f_\kappa[c_j]$, $s_j = Enc_{\lambda_j}[r_j]$ and $f_\kappa(c_j)$ is a function that utilizes a given one of the symmetric keys of the symmetric-key cryptographic module 215 of the second cryptographic device, again denoted as secret key $\kappa$. In this example, Enc denotes encryption or authenticated encryption and Dec is the decryption or authenticated decryption counterpart to Enc.

An exemplary protocol based on the implementation described above is as follows, carried out between a verifier denoted V and a device D containing the symmetric-key cryptographic module denoted SKCM, where D may comprise an iOS device. These protocol entities correspond to verifier 225 and second cryptographic device 204 in the FIG. 2 embodiment.

1. Registration:
   (a) V locally generates a set of challenge-response pairs (C,R).
   (b) V transmits each pair $(c_i, r_i) \in C \times R$ to D.
   (c) D computes $\lambda_i = f_\kappa(c_i)$ for each $c_i$, and stores, $(s_i, i)$ where $s_i = Enc_{\lambda_i}[r_i]$. D then deletes $\{r_i\}$ and $\{\lambda_i\}$.
   (d) V initializes counter j←1.

2. Authentication:
   (a) To authenticate the SKCM, V transmits challenge $(c_j, j)$ to D.
   (b) D uses the SKCM to compute $\lambda_j = j_\kappa[c_j]$. It retrieves $(s_j, j)$ and computes $r_j' = Dec_{\lambda_j}[s_j]$. D returns $r_j'$.
   (c) On receiving response $r_j'$, V accepts the authentication session if and only if $r_j' = r_j$. V sets j←j+1.

Again, the particular challenge-response protocols described above are exemplary only, and other protocols can be used in other embodiments.

In the above protocols, the verifier V may generate the challenge set in any of a number of different ways. For example, in an embodiment involving a time-synchronous authentication token such as an RSA SecurID® authentication token, the challenge is implicit and comprises the current time to a granularity of one minute. Accordingly, in such an embodiment the verifier can compute challenges for one-minute intervals or epochs denoted t by computing a challenge $c_i = g(t, v)$, where v is a device-specific challenge key and g is a cryptographic operation such as hashing. Other types of time intervals with less than one-minute granularity may be used since a verifier of an RSA SecurID® authentication token can generally tolerate a certain amount of device desynchronization. Alternative embodiments may utilize event-based epochs in place of or in combination with time-based epochs.

It is also possible that the first cryptographic device 202 may send a given challenge to the second cryptographic device 204 by directing storage of the given challenge in encrypted form on the second cryptographic device. For example, rather than issuing the challenge $c_i$ to D directly, V can store it in encrypted form on D, as $w_i = Enc_{PK_i}[c_i]$ where $PK_i$ is a public key whose corresponding private key $SK_i$ derives from sources other than the verifier. Such an embodiment may involve utilization of, again by way of example, a suitably conditioned user password or biometric, secrets deriving from physical context such as a printed quick response (QR) code held by the user, or a service that publishes public keys whose corresponding secret keys it reveals over time.

Accordingly, the challenge-response techniques disclosed herein, although particularly well-suited for use with symmetric-key cryptographic modules, can also be adapted in a straightforward manner for use with public-key cryptographic modules. For example, the registration modes of operation described in conjunction with illustrative embodiments above allow a verifier to incur computational burdens of response verification up front. As a result, authentication can be performed using an on-line equality check that is delegated to a low-power or high-throughput verifying entity.

As a more particular example, a first cryptographic device comprising the verifier can construct ciphertexts on random or pseudorandom values using the public key $PK_i$. A given ciphertext is then used as a challenge, while the corresponding plaintext is the appropriate response. The plaintext responses can be generated by a second cryptographic device that decrypts challenges using the secret key $SK_i$. Alternatively, the verifier can send a set of challenges and obtain signature responses on them from the second cryptographic device. In both cases, the verifier gains the ability to perform the computationally-intensive operation of response verification up front.

The disclosed techniques can also be adapted for use by applications with indirect access to keys that are protected by software. Examples include keys in an iOS device that are derived using a crypto engine but are exported to the operating system. Applications generally do not have access to these keys, but may gain indirect access by, for example, reading files encrypted under them.

It is to be appreciated that a given embodiment of the system 200 may include multiple instances of each of the first and second cryptographic devices, and possibly additional or alternative system and device components, although only single instances of illustrative examples of respective first and second cryptographic devices are shown in the simplified system diagram of FIG. 2 for clarity of illustration. Also, other embodiments may combine certain device components, such as registration module 232 and authentication module 234, into a single component. Also, device components may be eliminated, modified or replaced in other embodiments.

Challenge-response authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The particular processing operations and other system functionality described in conjunction with FIGS. 1 and 2 are presented by way of illustrative example only, and should not be construed as limiting the scope of embodiments of the invention in any way. Alternative embodiments can use other types of processing operations for challenge-response authentication. For example, the particular protocol operations may be varied in other embodiments, or certain operations may be performed at least in part concurrently with other operations another rather than serially.

It is to be appreciated that challenge-response authentication functionality such as that described in conjunction with FIGS. 1 and 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, these embodiments allow a symmetric-key cryptographic module to be authenticated using a challenge-response protocol without requiring that the verifying device have knowledge of any symmetric key of the symmetric-key cryptographic module.

As indicated previously, the systems 100 or 200 may be implemented using one or more processing platforms. One or more of the processing modules or other components of systems 100 or 200 may therefore each run on a computer, server, storage device or other processing platform element. A given such element may be viewed as an example of what is more generally referred to herein as a "processing device."

Referring initially to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, ... 302-M implemented using a hypervisor 304. The hypervisor 304 runs on physical infrastructure 305. The cloud infrastructure 300 further comprises sets of applications 310-1, 310-2, ... 310-M running on respective ones of the virtual machines 302-1, 302-2, ... 302-M under the control of the hypervisor 304.

The cloud infrastructure 300 may encompass an entire system 100 or 200 or only portions of that system, such as one or more of the servers 102 or one or more of the clients 104 in the system 100.

Although only a single hypervisor 304 is shown in the embodiment of FIG. 3, the system 100 or 200 may of course include multiple hypervisors each providing a set of virtual machines using at least one underlying physical machine.

An example of a commercially available hypervisor platform that may be used to implement hypervisor 304 and possibly other portions of system 100 or 200 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of system 100 or 200.

Another example of a processing platform is processing platform 400 shown in FIG. 4. The processing platform 400 in this embodiment comprises at least a portion of the system 100 or 200 and includes a plurality of processing devices, denoted 402-1, 402-2, 402-3, ... 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 or 200 may include additional or alternative processing platforms, as well as numerous distinct processing platforms in any combination, with each such platform comprising one or more computers, servers, storage devices or other processing devices.

Multiple elements of system 100 or 200 may be collectively implemented on a common processing platform of the type shown in FIG. 3 or 4, or each such element may be implemented on a separate processing platform.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from challenge-response authentication as disclosed herein. Also, the particular configuration of communication system and processing device elements shown in FIGS. 1-4, and the associated challenge-response authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method performed by a first cryptographic device, comprising:
   in a registration mode of operation:
      generating a set of challenges, wherein the set of challenges comprises n randomly selected multi-bit values, wherein a given one of the n randomly selected multi-bit values comprises a k-bit randomly selected value, and wherein n and k are security parameters denoting the number of challenges generated by the first cryptographic device and the length of the given challenge generated by the first cryptographic device, respectively;
      sending the challenges to a second cryptographic device, the second cryptographic device comprising a key-based cryptographic module that utilizes one or more secret keys;
      receiving from the second cryptographic device a set of first responses, each first response corresponding to a respective one of the challenges; and
      storing information characterizing the first responses; and in an authentication mode of operation:
    sending a selected one of the challenges to the second cryptographic device;
    receiving from the second cryptographic device a second response to the selected challenge; and
    authenticating the second cryptographic device utilizing the second response and the stored information;
wherein the first cryptographic device generates the challenges in the registration mode of operation without having knowledge of values of said one or more secret keys of the key-based cryptographic module of the second cryptographic device;
wherein the first responses received from the second cryptographic device are based at least in part on at least one of said one or more secret keys of the key-based cryptographic module of the second cryptographic device; and
wherein the first cryptographic device is configured to authenticate the second cryptographic device in the authentication mode of operation using the second response without having knowledge of the values of said one or more secret keys of the key-based cryptographic module of the second cryptographic device.

2. The method of claim 1 further comprising repeating the sending of a selected one of the challenges, the receiving of a second response to the selected challenge, and the authenticating of the second cryptographic device, for each of a plurality of additional different selected ones of the challenges.

3. The method of claim 1 wherein the set of challenges comprise a set $C=\{c_i\}_{i=1}^{n}$ of n challenges and wherein the given challenge $c_i \in_R \{0,1\}^k$ is a randomly selected k-bit value.

4. The method of claim 3 wherein the first responses comprise a set of n responses $R=\{r_i\}_{i=1}^{n}$ received responsive to corresponding ones of the set of n challenges $C=\{c_i\}_{i=1}^{n}$, where response $r_i=f_\kappa(c_i)$ for each $c_i$ and $f_\kappa(c_i)$ is a function that utilizes a given one of the secret keys, denoted as secret key $\kappa$.

5. The method of claim 4 wherein the selected challenge is a challenge $c_j$ selected from the set of challenges $C=\{c_i\}_{i=1}^{n}$ based on a current counter value j, and wherein the second cryptographic device is authenticated if and only if $r_j'=r_j$, where $r_j'$ is the response to the selected challenge $c_j$.

6. The method of claim 1 wherein storing information characterizing the first responses comprises one of:
    storing the first responses for use in the authentication mode of operation; and
    storing information derived at least in part from the first responses but not storing the responses themselves for use in the authentication mode of operation.

7. The method of claim 1 further comprising:
    initializing a counter in the registration mode of operation;
    selecting the challenge in the authentication mode of operation based at least in part on a current value of the counter; and
    incrementing the counter if the second cryptographic device is authenticated based on its response to the selected challenge.

8. The method of claim 1 wherein sending the given challenge to the second cryptographic device comprises directing storage of the given challenge in encrypted form on the second cryptographic device.

9. The method of claim 8 wherein the given challenge comprises a challenge $c_i$ and the given challenge in encrypted form comprises an encrypted challenge $w_i=Enc_{PK_i}[c_i]$, where $PK_i$ is a public key having a corresponding secret key $SK_i$ having a value that is unknown to the first cryptographic device.

10. The method of claim 1 wherein the challenges comprise a set of ciphertexts generated by the first cryptographic device using a public key of the second cryptographic device.

11. The method of claim 10 wherein the first responses comprise a corresponding set of plaintexts computed by the second cryptographic device decrypting respective ones of the ciphertexts using a secret key corresponding to the public key.

12. The method of claim 10 wherein the first responses comprise a corresponding set of signed ciphertexts computed by the second cryptographic device signing respective ones of the ciphertexts using a secret key corresponding to the public key.

13. A computer program product comprising a non-transitory processor-readable storage medium having embodied therein one or more software programs, wherein the one or more software programs when executed by a processor of a first cryptographic device cause the first cryptographic device to:
    in a registration mode of operation:
        generate a set of challenges, wherein the set of challenges comprises n randomly selected multi-bit values, wherein a given one of the n randomly selected multi-bit values comprises a k-bit randomly selected value, and wherein n and k are security parameters denoting the number of challenges generated by the first cryptographic device and the length of the given challenge generated by the first cryptographic device, respectively;
        send the challenges to a second cryptographic device, the second cryptographic device comprising a key-based cryptographic module that utilizes one or more secret keys;
        receive from the second cryptographic device a set of first responses, each first response corresponding to a respective one of the challenges; and
        store information characterizing the first responses; and
    in an authentication mode of operation:
        send a selected one of the challenges to the second cryptographic device;
        receive from the second cryptographic device a second response to the selected challenge; and
        authenticate the second cryptographic device utilizing the second response and the stored information;
    wherein the first cryptographic device generates the challenges in the registration mode of operation without having knowledge of values of said one or more secret keys of the key-based cryptographic module of the second cryptographic device;
    wherein the first responses received from the second cryptographic device are based at least in part on at least one of said one or more secret keys of the key-based cryptographic module of the second cryptographic device; and
    wherein the first cryptographic device is configured to authenticate the second cryptographic device in the authentication mode of operation using the second response without having knowledge of the values of said one or more secret keys of the key-based cryptographic module of the second cryptographic device.

14. An apparatus comprising:
    a first cryptographic device comprising a processor coupled to a memory;
    the first cryptographic device being configured:
    in a registration mode of operation:
        to generate a set of challenges, wherein the set of challenges comprises n randomly selected multi-bit values, wherein a given one of the n randomly selected multi-bit values comprises a k-bit randomly selected value, and wherein n and k are security parameters denoting the number of challenges generated by the first cryptographic device and the length of the given challenge generated by the first cryptographic device, respectively;

to send the challenges to a second cryptographic device, the second cryptographic device comprising a key-based cryptographic module that utilizes one or more secret keys;

to receive from the second cryptographic device a set of first responses, each first response corresponding to a respective one of the challenges;

to store in the memory information characterizing the first responses; and in an authentication mode of operation:
to send a selected one of the challenges to the second cryptographic device;
to receive from the second cryptographic device a second response to the selected challenge; and
to authenticate the second cryptographic device utilizing the second response and the stored information;

wherein the first cryptographic device is configured under control of the processor to generate the challenges in the registration mode of operation without having knowledge of values of said one or more secret keys of the key-based cryptographic module of the second cryptographic device;

wherein the first responses received from the second cryptographic device are based at least in part on at least one of said one or more secret keys of the key-based cryptographic module of the second cryptographic device; and wherein the first cryptographic device is configured under control of the processor to authenticate the second cryptographic device in the authentication mode of operation using the second response without having knowledge of the values of said one or more secret keys of the key-based cryptographic module of the second cryptographic device.

15. A method performed by a first cryptographic device, comprising:

in a registration mode of operation:
generating a plurality of challenge-response pairs, wherein the plurality of challenge-response pairs comprises n randomly selected multi-bit challenge values, wherein a given one of the n randomly selected multi-bit challenge values comprises a k-bit randomly selected challenge value, and wherein n and k are security parameters denoting the number of challenges generated by the first cryptographic device and the length of the given challenge generated by the first cryptographic device, respectively;
sending the challenge-response pairs to a second cryptographic device, the second cryptographic device comprising a key-based cryptographic module that utilizes one or more secret keys;

in an authentication mode of operation:
sending a selected challenge of one of the challenge-response pairs to the second cryptographic device;
receiving from the second cryptographic device a response to the selected challenge; and
authenticating the second cryptographic device utilizing the response to the selected challenge;

wherein the first cryptographic device generates the challenge-response pairs in the registration mode of operation without having knowledge of values of said one or more secret keys of the key-based cryptographic module of the second cryptographic device;

wherein the response received from the second cryptographic device is based at least in part on at least one of said one or more secret keys of the key-based cryptographic module of the second cryptographic device; and wherein the first cryptographic device authenticates the second cryptographic device in the authentication mode of operation using the response without having knowledge of the values of said one or more secret keys of the key-based cryptographic module of the second cryptographic device.

16. The method of claim 15 wherein the challenge-response pairs comprise a set of challenge-response pairs $(c_i, r_i) \in C \times R$ where $C=\{c_i\}_{i=1}^n$ and $R=\{r_i\}_{i=1}^n$ and further wherein the received response for a challenge $c_j$ is of the form $r_j'=Dec_{\lambda_j}[s_j]$ where $\lambda_j=f_\kappa[c_j]$, $s_j=Enc_{\lambda_j}[r_j]$ and $f_\kappa(c_j)$ is a function that utilizes a given one of the secret keys, denoted as secret key $\kappa$.

17. A computer program product comprising a non-transitory processor-readable storage medium having embodied therein one or more software programs, wherein the one or more software programs when executed by a processor of a first cryptographic device cause the first cryptographic device to:

in a registration mode of operation:
generate a plurality of challenge-response pairs, wherein the plurality of challenge-response pairs comprises n randomly selected multi-bit challenge values, wherein a given one of the n randomly selected multi-bit challenge values comprises a k-bit randomly selected challenge value, and wherein n and k are security parameters denoting the number of challenges generated by the first cryptographic device and the length of the given challenge generated by the first cryptographic device, respectively;
send the challenge-response pairs to a second cryptographic device, the second cryptographic device comprising a key-based cryptographic module that utilizes one or more secret keys;

in an authentication mode of operation:
send a selected challenge of one of the challenge-response pairs to the second cryptographic device;
receive from the second cryptographic device a response to the selected challenge; and
authenticate the second cryptographic device utilizing the response to the selected challenge;

wherein the first cryptographic device generates the challenge-response pairs in the registration mode of operation without having knowledge of values of said one or more secret keys of the key-based cryptographic module of the second cryptographic device;

wherein the response received from the second cryptographic device is based at least in part on at least one of said one or more secret keys of the key-based cryptographic module of the second cryptographic device; and wherein the first cryptographic device authenticates the second cryptographic device in the authentication mode of operation using the response without having knowledge of the values of said one or more secret keys of the key-based cryptographic module of the second cryptographic device.

18. An apparatus comprising:
a first cryptographic device comprising a processor coupled to a memory;

the first cryptographic device being configured:
in a registration mode of operation:
to generate a plurality of challenge-response pairs, wherein the plurality of challenge-response pairs comprises n randomly selected multi-bit challenge values, wherein a given one of the n randomly selected multi-bit challenge values comprises a k-bit randomly selected challenge value, and wherein n and k are security parameters denoting the number of challenges generated by the first cryptographic device and the length of the given challenge generated by the first cryptographic device, respectively; and
to send the challenge-response pairs to a second cryptographic device, the second cryptographic device comprising a key-based cryptographic module that utilizes one or more secret keys; and
in an authentication mode of operation:
to send a selected challenge of one of the challenge-response pairs to the second cryptographic device;
to receive from the second cryptographic device a response to the selected challenge; and
to authenticate the second cryptographic device utilizing the response to the selected challenge;
wherein the first cryptographic device is configured under control of the processor to generate the challenge-response pairs in the registration mode of operation without having knowledge of values of said one or more secret keys of the key-based cryptographic module of the second cryptographic device;
wherein the response received from the second cryptographic device is based at least in part on at least one of said one or more secret keys of the key-based cryptographic module of the second cryptographic device; and
wherein the first cryptographic device is configured under control of the processor to authenticate the second cryptographic device in the authentication mode of operation using the response without having knowledge of the values of said one or more secret keys of the key-based cryptographic module of the second cryptographic device.

19. A method performed by a first cryptographic device, comprising:
in a registration mode of operation:
receiving a plurality of challenge-response pairs from a second cryptographic device, wherein the plurality of challenge-response pairs comprises n randomly selected multi-bit challenge values, wherein a given one of the n randomly selected multi-bit challenge values comprises a k-bit randomly selected challenge value, and wherein n and k are security parameters denoting the number of challenges and the length of the given challenge, respectively; and
storing the responses from the received challenge-response pairs in encrypted form utilizing one or more secret keys of a key-based cryptographic module of the first cryptographic device; and
in an authentication mode of operation:
receiving a selected challenge of one of the challenge-response pairs from the second cryptographic device; and
sending to the second cryptographic device a response to the selected challenge, the response being generated at least in part by decrypting the corresponding encrypted response using said one or more secret keys;
wherein the first cryptographic device is authenticated by the second cryptographic device utilizing the response to the selected challenge without the second cryptographic device having knowledge of values of said one or more secret keys of the key-based cryptographic module of the first cryptographic device.

20. The method of claim 19 wherein the challenge-response pairs comprise a set of challenge-response pairs $(c_i, r_i) \in C \times R$ where $C = \{c_i\}_{i=1}^n$ and $R = \{r_i\}_{i=1}^n$ and further wherein the response to the selected challenge is of the form $r_j' = Dec_{\lambda_j}[s_j]$ where $\lambda_j = f_\kappa[c_j]$, $c_j$ is the selected challenge, $s_j = Enc_{\lambda_j}[r_j]$ is the stored response in encrypted form, and $f_\kappa(c_j)$ is a function that utilizes a given one of the secret keys, denoted as secret key $\kappa$.

21. A computer program product comprising a non-transitory processor-readable storage medium having embodied therein one or more software programs, wherein the one or more software programs when executed by a processor of a first cryptographic device cause the first cryptographic device to:
in a registration mode of operation:
receive a plurality of challenge-response pairs from a second cryptographic device, wherein the plurality of challenge-response pairs comprises n randomly selected multi-bit challenge values, wherein a given one of the n randomly selected multi-bit challenge values comprises a k-bit randomly selected challenge value, and wherein n and k are security parameters denoting the number of challenges and the length of the given challenge, respectively; and
store the responses from the received challenge-response pairs in encrypted form utilizing one or more secret keys of a key-based cryptographic module of the first cryptographic device; and
in an authentication mode of operation:
receive a selected challenge of one of the challenge-response pairs from the second cryptographic device; and
send to the second cryptographic device a response to the selected challenge, the response being generated at least in part by decrypting the corresponding encrypted response using said one or more secret keys;
wherein the first cryptographic device is authenticated by the second cryptographic device utilizing the response to the selected challenge without the second cryptographic device having knowledge of values of said one or more secret keys of the key-based cryptographic module of the first cryptographic device.

22. An apparatus comprising:
a first cryptographic device comprising a key-based cryptographic module that utilizes one or more secret keys;
the first cryptographic device being configured:
in a registration mode of operation:
to receive a plurality of challenge-response pairs from a second cryptographic device, wherein the plurality of challenge-response pairs comprises n randomly selected multi-bit challenge values, wherein a given one of the n randomly selected multi-bit challenge values comprises a k-bit randomly selected challenge value, and wherein n and k are security parameters denoting the number of challenges and the length of the given challenge, respectively; and
to store the responses from the received challenge-response pairs in encrypted form utilizing said one or more secret keys of the key-based cryptographic module; and in an authentication mode of operation:
- to receive a selected challenge of one of the challenge-response pairs from the second cryptographic device; and
- to send to the second cryptographic device a response to the selected challenge, the response being generated at least in part by decrypting the corresponding encrypted response using said one or more secret keys;

wherein the first cryptographic device is authenticated by the second cryptographic device utilizing the response to the selected challenge without the second cryptographic device having knowledge of values of said one or more secret keys of the key-based cryptographic module of the first cryptographic device.

23. The apparatus of claim 22 wherein the key-based cryptographic module comprises a symmetric-key cryptographic module.

24. The apparatus of claim 22 wherein the key-based cryptographic module comprises a public-key cryptographic module.

* * * * *